(12) United States Patent
Kawahara et al.

(10) Patent No.: US 6,538,064 B2
(45) Date of Patent: Mar. 25, 2003

(54) METHOD FOR PRODUCING ETHYLENE-VINYL ALCOHOL COPOLYMER RESIN COMPOSITION

(75) Inventors: Takaharu Kawahara, Okayama (JP); Toshio Tuboi, Okayama (JP); Tetsuya Hikasa, Okayama (JP); Naoyuki Himi, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/874,301

(22) Filed: Jun. 6, 2001

(65) Prior Publication Data

US 2002/0035185 A1 Mar. 21, 2002

(30) Foreign Application Priority Data

Jun. 6, 2000 (JP) ........................................ 2000-169363

(51) Int. Cl.⁷ .................................................. C08F 8/00
(52) U.S. Cl. ........................... 525/61; 524/404; 524/405
(58) Field of Search ........................... 525/61; 524/404, 524/405

(56) References Cited

U.S. PATENT DOCUMENTS

| | | |
|---|---|---|
| 5,118,743 A | 6/1992 | Yonezu et al. |
| 5,744,657 A | 4/1998 | Moritani et al. |
| 5,866,655 A | 2/1999 | Fujiwara et al. |
| 6,184,288 B1 | 2/2001 | Ninomiya et al. ............ 525/61 |
| 6,288,165 B1 | 9/2001 | Moritani et al. |

FOREIGN PATENT DOCUMENTS

| | | |
|---|---|---|
| EP | 0 892 006 A2 | 7/1998 |
| EP | 0 906 924 | 4/1999 |
| EP | 0 930 339 A1 | 7/1999 |
| EP | 0 937 557 A1 | 8/1999 |
| JP | 49-20615 | 5/1974 |
| JP | 49-020615 | 5/1974 |
| JP | 64-66262 | 3/1989 |
| JP | 8-27287 | 1/1996 |
| JP | 11-106592 | 4/1999 |
| JP | 11-60874 | 5/1999 |
| JP | 11-152307 | 6/1999 |
| JP | 11-292929 | 10/1999 |
| JP | 2000-43040 | 2/2000 |
| JP | 2000-44756 | 2/2000 |

*Primary Examiner*—Bernard Lipman
(74) *Attorney, Agent, or Firm*—Oblon, Spivak, McClelland, Maier & Neustadt, P.C.

(57) ABSTRACT

In the present invention, particles of an ethylene-vinyl alcohol copolymer (EVOH) are contacted with a solution containing a boron compound, whereby to obtain a substantially homogeneous distribution of the boron compound within the particles. For example, EVOH and the solution are continuously fed into a treatment apparatus and brought into contact with each other in the treatment apparatus, and the EVOH when continuously removed from the apparatus is in contact with the solution containing the boron compound in a concentration of at least 0.7 times but not more than 1.3 times a solution equilibrium concentration.

18 Claims, 8 Drawing Sheets

METHOD FOR PRODUCING ETHYLENE-VINYL ALCOHOL COPOLYMER RESIN COMPOSITION

FIELD OF THE INVENTION

The present invention relates to a method for producing an ethylene-vinyl alcohol copolymer (hereinafter abbreviated as "EVOH") resin composition.

BACKGROUND OF THE INVENTION

EVOH is a useful polymer excellent in oxygen shielding property, oil resistance, antistatic property, mechanical strength and the like, and is used widely as a packaging material in the form of a film, a sheet, a container or the like. Usually, such packages are produced by melt molding of EVOH. Thus, in EVOH, importance is given to a long-run property at the time of melt molding, which is an ability to withstand a long molding run with few fish eyes or stripes, as well as appearance characteristics of molded products (little coloration, inhibition of generation of fish eye).

To provide EVOH with such characteristics, it is known to add acids or metal salts to EVOH (JP 64(1989)-66262A), and to add a boron compound to EVOH (JP 49(1974)-20615B). Furthermore, as methods for treatment with these additives, JP 11(1999)-292929A proposes a method in which EVOH is treated by causing an aqueous solution of a treating agent to spout from a nozzle while allowing EVOH to flow. Furthermore, JP 11(1999)-152307A proposes a method in which EVOH is brought into contact with an aqueous solution of an additive in a treatment column (tower type device) while the EVOH and the aqueous solution flow in countercurrent to each other. In this method, because the EVOH is treated continuously using a treatment column, the treatment can be carried out more efficiently than a treatment of batch type. Furthermore, unevenness in the treatment can be reduced, compared to a treatment of batch type, where a solution is prepared each time.

When EVOH is treated with a boron compound such as boric acid among the above-mentioned treating agents, particularly the effect of improvement in the thermal stability of EVOH can be obtained. However, when the method of continuous treatment disclosed in JP 11(1999)-152307A is applied to a treatment of EVOH using a boron compound, many fish eyes are generated at the time of melt molding, and also the period of continuous operation is limited.

DISCLOSURE OF THE INVENTION

It is therefore desirable to provide a method for producing an EVOH resin composition that addresses the above-mentioned problems.

The inventors have now surprisingly found that the above-mentioned problems are caused by uneven treatment of EVOH resulting from high adsorptivity of boron compounds. Thus, viewed from one aspect, the invention provides a method for producing an ethylene-vinyl alcohol copolymer resin composition, which method comprises contacting particles of an ethylene-vinyl alcohol copolymer with a solution containing a boron compound whereby to obtain a substantially homogeneous distribution of said boron compound within said particles. As used herein, the term "homogeneous" is intended to encompass any substantially uniform distribution of boron compound within the polymer particle.

Preferably, the method for producing an EVOH resin composition of the present invention includes bringing EVOH into contact with a solution containing a boron compound, wherein EVOH and the solution are continuously fed into a treatment apparatus and brought into contact with each other in the treatment apparatus. EVOH is then continuously removed from the apparatus in contact with a solution containing the boron compound in a concentration of at least 0.7 times but not more than 1.3 times a solution equilibrium concentration, thereby obtaining an EVOH resin composition having a concentration of boron compound substantially at a resin equilibrium concentration corresponding to the solution equilibrium concentration.

It is herein defined that the solution equilibrium concentration (CeqSL) and the resin equilibrium concentration (CeqEV) are concentrations of the boron compound in the solution and in EVOH, respectively, achieved when EVOH is soaked in the solution and the boron compound in EVOH equilibrates with the boron compound in the solution. With respect to a resin of a given composition, there is a relationship between CeqSL and CeqEV such that when one is determined, the other is fixed. As used herein, "an EVOH resin composition" refers to EVOH treated with a solution containing a boron compound. In another aspect of the invention, EVOH and the solution are continuously fed into a treatment apparatus and brought into contact with each other in the treatment apparatus. EVOH is then continuously removed from the apparatus in contact with a solution containing the boron compound in a concentration of at least 0.7 times but not more than 1.3 times a solution equilibrium concentration, thereby obtaining an EVOH resin composition having a concentration of boron compound substantially at a resin equilibrium concentration corresponding to the solution equilibrium concentration.

DESCRIPTION OF THE PREFERRED EMBODIMENTS

Preferred embodiments of the present invention are described below.

A boron compound is one of the most important additives to EVOH. When a boron compound represented by boric acid is added, thermal stability (long-run property) and mechanical properties of EVOH at the time of melt molding are improved. Furthermore, in the soaking treatment of EVOH, a boron compound is characterized in that it has a higher adsorptivity to EVOH than other treatment agents such as a carboxylic acid compound, a phosphoric acid compound, an alkali metal salt, or an alkaline earth metal salt.

Figure 8:
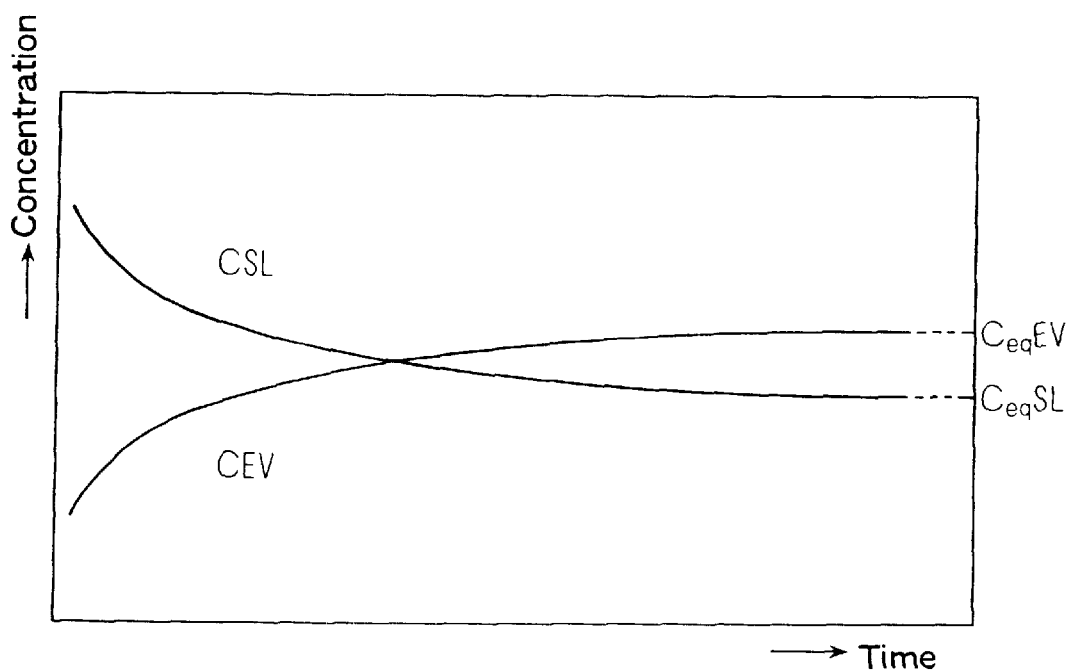
FIG. 8 shows changes in resin concentration (CEV) and solution concentration (CSL) of boron when EVOH is brought into contact with a solution containing a boron compound.

When EVOH is soaked in a solution containing a boron compound, a boron compound concentration (CSL) in the solution and a boron compound concentration (CEV) in EVOH generally change with time as shown in FIG. 8. As a result of the high adsorptivity of the boron compound, when reaching an equilibrium, the boron compound concentration (CeqEV) in EVOH often exceeds the boron compound concentration (CeqSL) in the solution (is CeqEV >CeqSL).

JP 11(1999)-152307A describes a method of continuous treatment of EVOH in which EVOH pellets are continuously fed into a treatment column through a top portion thereof, and a treatment solution is continuously fed into the treatment column through a lower portion thereof, and the EVOH pellets are brought into contact with the treatment solution in the treatment column while the EVOH pellets and the treatment solution flow in countercurrent to each other. However, when using this method with a boron compound as a treating agent, the EVOH is taken out of the lower portion of the treatment column under conditions in which the EVOH is in contact with a treatment solution having a high concentration of the boron compound. On the surface of the EVOH pellets treated in this way, the boron compound remains at a high concentration, because the high adsorptivity of the boron compound inhibits its diffusion. The inventors have confirmed experimentally that many fish eyes are generated at the time of melt molding when a boron compound is present in a high concentration locally as in this case.

On the other hand, in the present invention, while treating the EVOH continuously in a treatment apparatus, the boron compound concentration in the treatment solution in contact with EVOH when EVOH is taken out of the treatment apparatus is within the above specified range, which is approximately equal to the boron compound concentration in the solution in equilibrium with the boron compound concentration in EVOH after treatment. Thereby, the boron compound does not remain in a high concentration on the surface of the pellets.

In the present invention, it is preferable that the solution equilibrium concentration (CeqSL) is at least 0.0001 wt % but not more than 0.05 wt % (based on the weight of the element boron; this convention is used throughout). When this concentration is too high, visible imperfections may result at the time of molding. Conversely, when this concentration is too low, the treatment may be ineffective. From these viewpoints, it is more preferable that CeqSL is at least 0.0004 wt %, and further preferably not more than 0.01 wt %.

From the same viewpoint, it is preferable that the resin equilibrium concentration (CeqEV) is at least 0.001 wt % but not more than 0.3 wt %, when the EVOH is dry. It is more preferable that CeqEV is at least 0.005 wt %, and further preferably not more than 0.1 wt %.

It is preferable that the treatment with a solution containing a boron compound is carried out in a treatment column. This is because the treatment can be carried out efficiently. For example, in one embodiment of the present invention, the EVOH is brought into contact with a boron compound-containing solution in a treatment column while the EVOH and the solution flow in parallel with each other, and the EVOH in contact with a solution having a concentration of boron compound of at least 0.7 times but not more than 1.3 times the solution equilibrium concentration is continuously taken out of the column.

In this case, it is preferable that the concentration of the boron compound in the solution to be fed into the column (initial concentration) is at least 0.001 wt % but not more than 0.35 wt %, particularly preferably at least 0.003 wt % but not more than 0.1 wt %.

In another embodiment of the present invention, EVOH is continuously fed into a treatment column through an upper portion thereof, a first boron compound-containing solution (hereinafter may be referred to as "a first solution") is fed continuously into the treatment column through a middle portion thereof, a second boron compound-containing solution having a boron concentration of at least 0.7 times but not more than 1.3 times the solution equilibrium concentration (hereinafter may be referred to as "a second solution") is fed continuously into the column through a lower portion thereof, and the EVOH is brought into contact with the first and second solutions in the column while the EVOH flows in countercurrent to the first and second solutions. The first and second solutions are discharged continuously through an upper portion of the column, and the EVOH in contact with the second solution is taken out continuously through a bottom portion of the treatment column.

In another embodiment, the solution containing a boron compound in contact with the EVOH when the EVOH is removed from the treatment apparatus is defined as a second solution, and the EVOH is brought into contact with a first boron-containing solution before being brought into contact with the second solution.

In this case, it is preferable that the concentration of the boron compound in the first solution is higher than the concentration of the boron compound in the second solution. This is to carry out the treatment efficiently while preventing the boron compound from remaining in a high concentration. Furthermore, it is preferable that the concentration of the boron compound in the first solution before contact with the EVOH (initial concentration) is at least 0.001 wt % but not more than 0.35 wt %, particularly preferably at least 0.003 wt % but not more than 0.1 wt %.

In the present invention, the treatment may be carried out using at least two treatment apparatus including a pre-treatment apparatus. For example, after bringing the EVOH and the first solution into contact with each other in the pre-treatment apparatus, the EVOH may be brought into contact with the second solution in another treatment apparatus.

In a still another embodiment of the present invention, the EVOH, previously brought into contact with the first solution, is brought into contact with the second solution in a treatment column in which the EVOH and the second solution flow in parallel with each other. In this case, the concentration of the boron compound in the second solution may be adjusted in advance to at least 0.7 times but not more than 1.3 times the solution equilibrium concentration. EVOH may be taken out of the treatment column once the concentration of the boron compound in the second solution reaches at least 0.7 times but not more than 1.3 times the solution equilibrium concentration.

In still another embodiment of the present invention, the EVOH, previously brought into contact with the first solution, is brought into contact with the second solution containing a boron compound in a concentration of at least 0.7 times but not more than 1.3 times the solution equilibrium concentration in a treatment column in which the EVOH and the second solution flow in countercurrent to each other.

As described above, depending on the embodiment, it may not be necessary to adjust the concentration of the boron compound in the second solution (initial concentration) to at least 0.7 times but not more than 1.3 times the solution equilibrium concentration. In this case, just as in the first solution, the concentration of the boron compound in the second solution also may be at least 0.001 wt % but not more than 0.35 wt %.

Examples of the boron compound suitable for use in the method of the invention include boric acids, boric acid salts, boric acid esters, boron hydrides and the like. The boric acids include different types such as orthoboric acid, metaboric acid, tetraboric acid and the like, but they are not particularly limited. Usually, orthoboric acid, which is often simply referred to as boric acid, may be used. As the boric acid salts, alkali metal salts and alkaline earth metal salts of boric acids are suitable. However, borax also may be used. Examples of the boric acid esters include triethyl borate, trimethyl borate and the like. It is preferable that at least one compound selected from a boric acid and a boric acid salt is used as the boron compound.

It is preferable that the EVOH to be treated has an ethylene content of at least 20 mol % but not more than 70 mol %, and a saponification degree of at least 90 mol %. When the ethylene content is too low, the water resistance of the EVOH is deteriorated. Conversely, when the ethylene content is too high, gas barrier properties such as oxygen shielding property are reduced. When a saponification degree of the EVOH is too low, sufficient gas barrier properties also cannot be obtained. From these viewpoints, it is more preferable that the EVOH to be treated has an ethylene content of 25 to 60 mol %, and has a saponification degree of at least 95 mol %, particularly preferably at least 99 mol %.

In the present invention, it is preferable that EVOH is brought into contact with at least one compound selected from a carboxylic acid compound, a phosphoric acid compound, an alkali metal salt, and an alkaline earth metal salt. When these additives are used in combination with a boron compound, the EVOH can be improved further in mechanical properties, thermal stability and the like. The method for bringing such an additive into contact with the EVOH is not particularly limited. For example, a treatment solution containing the additive may be prepared apart from a solution containing a boron compound, and this treatment solution may be brought into contact with the EVOH. However, usually, a method of bringing the EVOH into contact with a treatment solution containing the additive with a boron compound is suitably used.

When a carboxylic acid compound is added, the EVOH can be improved in thermal stability and the like. Such carboxylic acids include oxalic acid, succinic acid, benzoic acid, citric acid, acetic acid, lactic acid, propionic acid and the like. Acetic acid, lactic acid and propionic acid are particularly preferred. It is preferable that the content of a carboxylic acid compound in the EVOH in dry state is at least 0.001 wt % but not more than 0.5 wt %. When the content is too large, sufficient interlayer adhesion cannot be obtained. Conversely, when the content is too small, prevention of coloration at the time of melt molding may not be obtained.

The EVOH also can be improved in thermal stability and the like by adding a phosphoric acid compound. It is preferable that the content of a phosphoric acid compound in the EVOH in dry state is at least 0.0001 wt % but not more than 0.1 wt % in terms of phosphate radical. When a phosphoric acid compound is added in an amount of appropriate range, coloring of EVOH molded products and generation of gels and hard spots can be inhibited. The phosphoric acid compound includes not only phosphoric acid and salts thereof but also phosphorous acid and salts thereof. The phosphoric acid salts may be any of primary phosphate, secondary phosphate and tertiary phosphate. As the phosphoric acid salts, alkali metal salts or alkaline earth metal salts are suitable, and sodium dihydrogenphosphate, potassium dihydrogenphosphate and disodium hydrogenphosphate are more suitable.

By incorporating an alkali metal salt, the EVOH can be improved in interlayer adhesiveness and compatibility effectively. It is preferable that the amount of an alkali metal salt added to the EVOH is from 5 to 5000 ppm, more preferably from 20 to 1000 ppm, still more preferably from 30 to 750 ppm in term of alkaline metal element. As the alkaline metal, lithium, sodium, potassium or the like may be used. As the alkali metal salt, an aliphatic carboxylic acid salt, aromatic carboxylic acid salt, phosphoric acid salt, metal complex or the like of an univalent metal may be used. For example, sodium acetate, potassium acetate, sodium propionate, sodium phosphate, lithium phosphate, sodium stearate, potassium stearate, sodium salts of ethylenediaminetetraacetic acid and the like may be employed. Among these, sodium acetate, sodium propionate, potassium acetate and sodium phosphate are preferred.

Furthermore, it is also preferable to add an alkaline earth metal salt. When an alkaline earth metal salt is added, the effect of improving coloring resistance is slightly reduced, however, extent of adhesion of the heat deteriorated resin to a die of a molding machine at the time of melt molding using resin composition pellets can be reduced further. The alkaline earth metal salt is not particularly limited, and for example, magnesium salts, calcium salts, barium salts, beryllium salts and the like may be used. Particularly, magnesium salts and calcium salts are suitable. The anionic species of the alkaline earth metal salt also is not limited particularly, but aliphatic carboxylic acid anions and phosphoric acid anions are suitable. Among these, magnesium acetate, calcium acetate, calcium propionate and sodium phosphate are preferred. It is preferable that the content of an alkaline earth metal in the EVOH is from 10 to 1000 ppm, more preferably from 20 to 500 ppm in terms of metal. When the content of an alkaline earth metal is less than 10 ppm, the effect of improving long-run property may be insufficient. When the content of an alkaline earth metal exceeds 1000 ppm, coloring at the time of resin melting may be more intense.

These additives used in combination with a boron compound are not limited by the above, but any known acids and salts thereof listed in the publications previously described in the prior art may be used without limitation.

In the following, preferred embodiments of the present invention will be described in detail with reference to the accompanying drawings. In these embodiments, examples using a column (tower type device) as a treatment apparatus are described. When using one or more treatment columns, the present invention can be carried out efficiently. Furthermore, in the following examples, a boric acid treatment solution is used as the boron compound-containing solution. As mentioned above, it is preferable that a treating agent such as a carboxylic acid compound, phosphoric acid compound or the like used in combination with a boron compound is added to the boric acid treatment solution. However, the treating agent also may be added as a separate solution in addition to the boric acid treatment solution.

Hereinafter, this "separate solution" simply is referred to as an acid treatment solution. The following descriptions are illustrative only, and the present invention is not limited by these descriptions, including the design and the number of the treatment apparatus, the type of the treating agents and the like. In FIGS. 1 to 6, the arrow of a solid line indicates a flow of EVOH pellets, and the arrow of a broken line indicates a flow of a boric acid treatment solution.

First Embodiment

One-column system: parallel flow treatment

Figure 1:
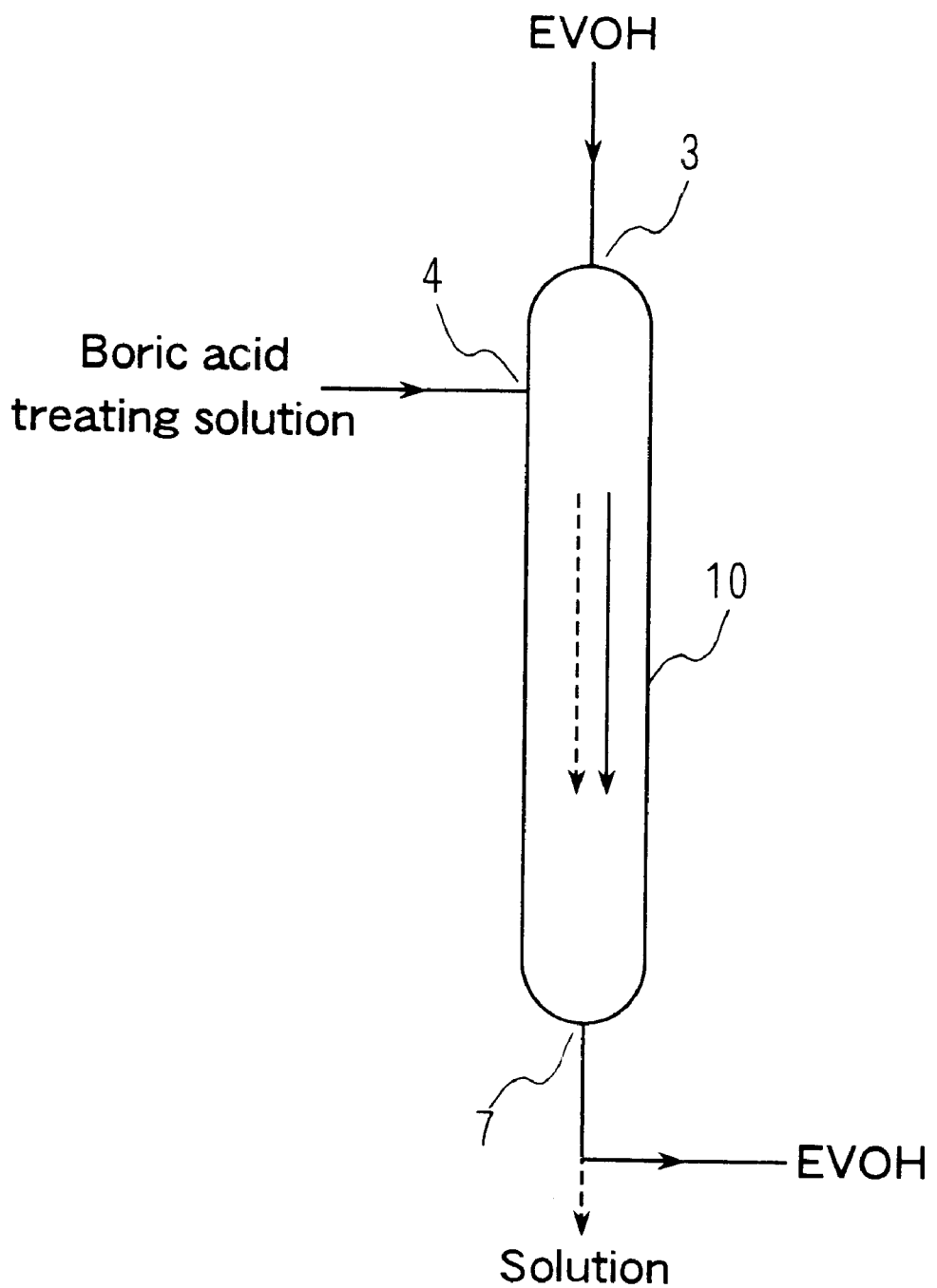
FIG. 1 shows an example of treatment apparatus suitable for carrying out the method of the present invention.

In an embodiment shown in FIG. 1, EVOH pellets are continuously fed into a treatment column 10 through a top portion 3 thereof, and a boric acid treatment solution is continuously fed into the treatment column through an upper portion 4 thereof. The EVOH pellets and the boric acid treatment solution are brought into contact with each other in the treatment column while flowing in parallel with each other, and removed continuously through a bottom portion 7 of the treatment column. As they flow from the upper portion to the lower portion in the treatment column, the concentration of boric acid in the boric acid treatment solution decreases, and conversely the concentration of boric acid in the EVOH pellets increases. In the vicinity of the opening for removal of the pellets at the bottom of the treatment column, the EVOH pellets and the boric acid treatment solution are approximately in equilibrium with respect to boric acid (see FIG. 8).

Thus, when the EVOH pellets and the boric acid treatment solution are brought into contact with each other while flowing in parallel with each other until the concentration of boric acid in the EVOH pellets and the concentration of boric acid in the boric acid treatment solution approximately equilibrate, the boric acid initially adhered onto the surface of the EVOH pellets in a high concentration is allowed to diffuse into the inside of the EVOH pellets, and the concentration of newly adhered boric acid on the surface of EVOH also decreases gradually. Thus, when the treatment is completed, EVOH resin composition pellets without an uneven distribution of boric acid in a high concentration on the surface while containing boric acid in a required concentration can be obtained. Furthermore, in this embodiment, when an acid treatment solution is used with a boric acid treatment solution, the acid treatment solution may be introduced continuously through an upper portion of the treatment column and discharged continuously through a bottom portion of the treatment column, similar to the boric acid treatment solution.

In this embodiment, because the treatment is carried out with a single treatment column, equipment can be simplified. Furthermore, because the treatment is carried out by parallel flow contact, the amount of discharged water can be smaller than in the case of a treatment by countercurrent flow contact.

Second Embodiment

One-column system: two-step countercurrent flow treatment

Figure 2:
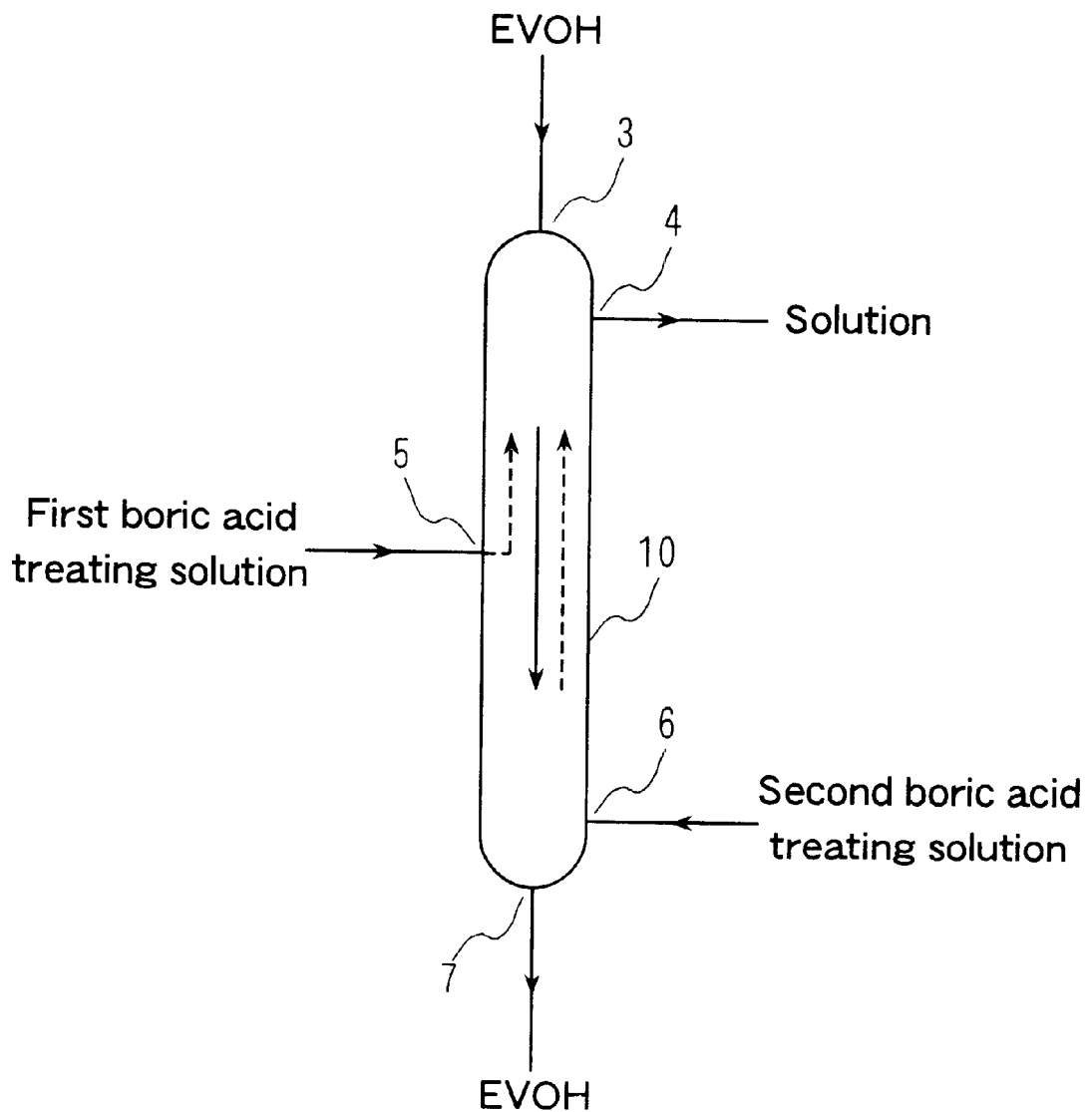
FIG. 2 shows another example of treatment apparatus suitable for carrying out the method of the present invention.

In an embodiment shown in FIG. 2, EVOH is continuously fed into a treatment column 10 through a top portion 3 thereof, a first boric acid treatment solution (first solution) is continuously fed into the treatment column 10 through a middle portion 5 thereof, and a second boric acid treatment solution (second solution) is continuously fed into the treatment column 10 through a lower portion 6 thereof. The EVOH is continuously removed from the treatment column 10 through a bottom portion 7 thereof, and both treatment solutions are discharged continuously through an upper portion 4 thereof. On an upper step of the treatment column, the EVOH is brought into contact with the first and second solutions while flowing in countercurrent to the first and second solutions. On a lower step thereof, the EVOH is brought into contact with the second solution while flowing in countercurrent to the second solution. In this embodiment, the concentration of boric acid in the EVOH also increases as the EVOH flows from the upper portion to the lower portion in the treatment column. In the vicinity of the opening for removing the EVOH pellets at the bottom of the treatment column, boric acid is contained in a required concentration in the EVOH pellets. Also, the second solution in contact with the EVOH pellets is prepared in advance as a solution having a boric acid concentration of at least 0.7 times but not more than 1.3 times, preferably substantially equal to, the boric acid concentration in a boric acid solution in equilibrium with respect to boric acid with the EVOH having a required boric acid concentration (solution equilibrium concentration).

Thus, when the EVOH is brought into contact with a boric acid treatment solution having a boric acid concentration substantially equal to a solution equilibrium concentration in a lower portion of a treatment column, the distribution of boric acid concentration from the surface to the inside of the EVOH pellets can be made uniform. Therefore, when the treatment is completed, EVOH resin composition pellets not having uneven distribution of boric acid on the surface while containing boric acid in a required concentration can be obtained. In this embodiment, when an acid treatment solution is used with a boric acid treatment solution, it is preferable that the acid treatment solution is introduced continuously through a lower portion of the treatment column and discharged continuously through an upper portion of the treatment column, similar to the second solution.

Furthermore, although not essential, it is preferable that the boron concentration of the first solution is higher than that of the second solution.

In this embodiment, because the treatment also is carried out using a single treatment column, equipment can be simplified. Furthermore, because the treatment is carried out by countercurrent flow contact, the adsorbed amount of a treating agent used in combination, such as a carboxylic acid compound, can be more stabilized than in the case of a treatment by parallel flow contact.

Third Embodiment

Multi-column system: parallel flow/parallel flow treatment

In this and subsequent embodiments, treatments using multiple treatment columns are described. Although two-column type treatment is described in this embodiment, three or more treatment columns also may be used as needed.

Figure 3:
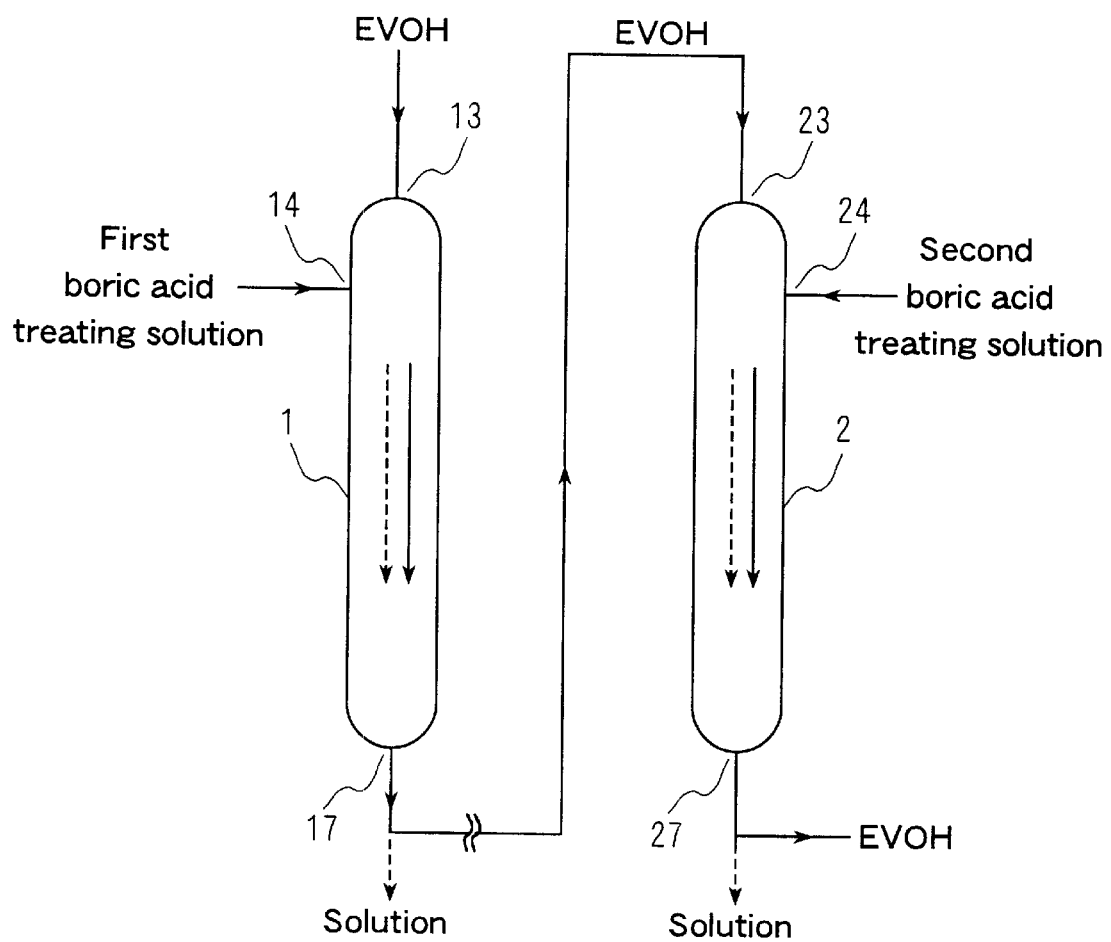
FIG. 3 shows still another example of treatment apparatus suitable for carrying out the method of the present invention.

In an embodiment shown in FIG. 3, a first treatment column 1 has a pre-treatment column and a second treatment column 2 as a final treatment column are used. Into the first treatment column 1, EVOH pellets are fed continuously through a top portion 13 thereof, and a first boric acid treatment solution (first solution) is fed continuously through an upper portion 14 thereof. The EVOH pellets and the first solution are brought into contact with each other in the first treatment column while flowing in parallel with each other, and continuously removed from the treatment column through a bottom portion 17 thereof. As they flow from the upper portion to the lower portion in the first treatment column, the concentration of boric acid in the first solution decreases, and conversely the concentration of boric acid in the EVOH pellets increases. Unlike the first embodiment, in this embodiment, it is not necessary that the EVOH pellets and the boric acid treatment solution reach equilibrium with respect to boric acid in the vicinity of the opening for removal of the pellets at the bottom of the treatment column.

Subsequently, the EVOH pellets are introduced continuously into the second treatment column 2 through a top portion 23 thereof. Into this treatment column, a second boric acid treatment solution (second solution) is also fed continuously through an upper portion 24 thereof. The EVOH pellets and the second solution are brought into contact with each other in the second treatment column while flowing in parallel with each other, and continuously removed from this treatment column through a bottom portion 27 thereof In the vicinity of the opening for removal of the pellets at the bottom of the treatment column, boric acid is contained in the EVOH pellets in a required concentration. Also, just as in the second embodiment, the second solution in contact with the EVOH pellets is prepared in advance as a solution having a boric acid concentration approximately equal to the solution equilibrium concentration.

Thus, when the EVOH pellets are brought into contact with a boric acid treatment solution having a boric acid concentration approximately equal to the solution equilibrium concentration in the second treatment column (the final treatment column), the distribution of boric acid concentration from the surface to the inside of the EVOH pellets can be made uniform while the EVOH pellets are in contact with the treatment solution. Therefore, when the treatment is completed, EVOH resin composition pellets not having uneven distribution of boric acid on the surface while containing boric acid in a required concentration can be obtained. In this embodiment, when an acid treatment solution is used with a boric acid treatment solution, it is preferable that the acid treatment solution is introduced continuously through an upper portion of at least one of the treatment columns, and discharged continuously through a bottom portion of the treatment column, similar to the boric acid treatment solution. When the acid treatment solution is fed into only one of the treatment columns, it is better to choose the final treatment column (this is also the same in the following embodiments.).

In this embodiment, just as in the second embodiment, it is preferable that the boron concentration of the first solution is higher than that of the second solution.

Like this embodiment, when a plurality of treatment columns are used, the content of boric acid in the EVOH pellets is stabilized easily.

Instead of preparing the second solution having a solution equilibrium concentration, operation in the final treatment column may be carried out such that the EVOH pellets and the second solution become approximately in equilibrium with respect to boric acid while the EVOH pellets and the second solution flow in parallel with each other and are brought into contact with each other during passage through the second column. This feature is just as in the first embodiment.

Fourth Embodiment

Multi-column type: countercurrent flow/ countercurrent flow treatment

Figure 4:
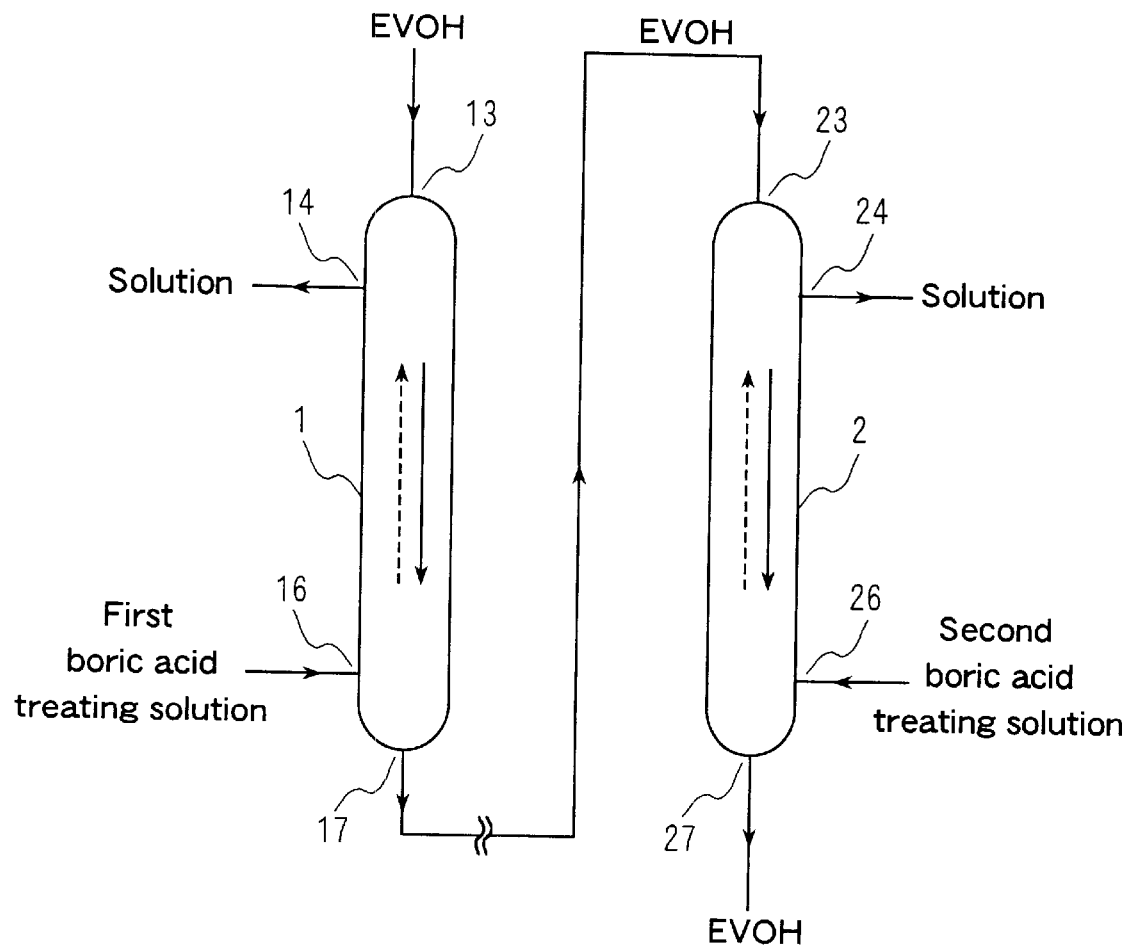
FIG. 4 shows still another example of treatment apparatus suitable for carrying out the method of the present invention.
Figure 5:
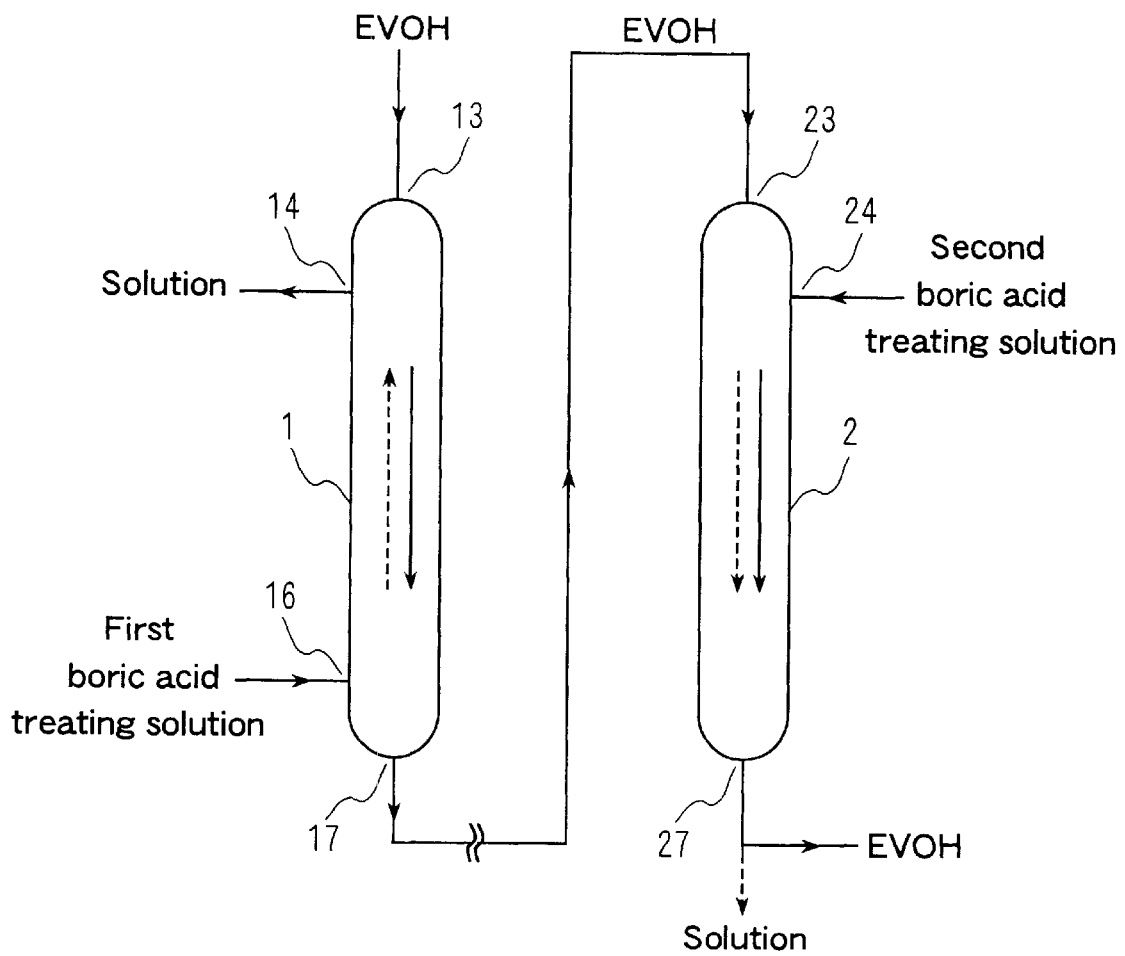
FIG. 5 shows still another example of treatment apparatus suitable for carrying out the method of the present invention.
Figure 6:
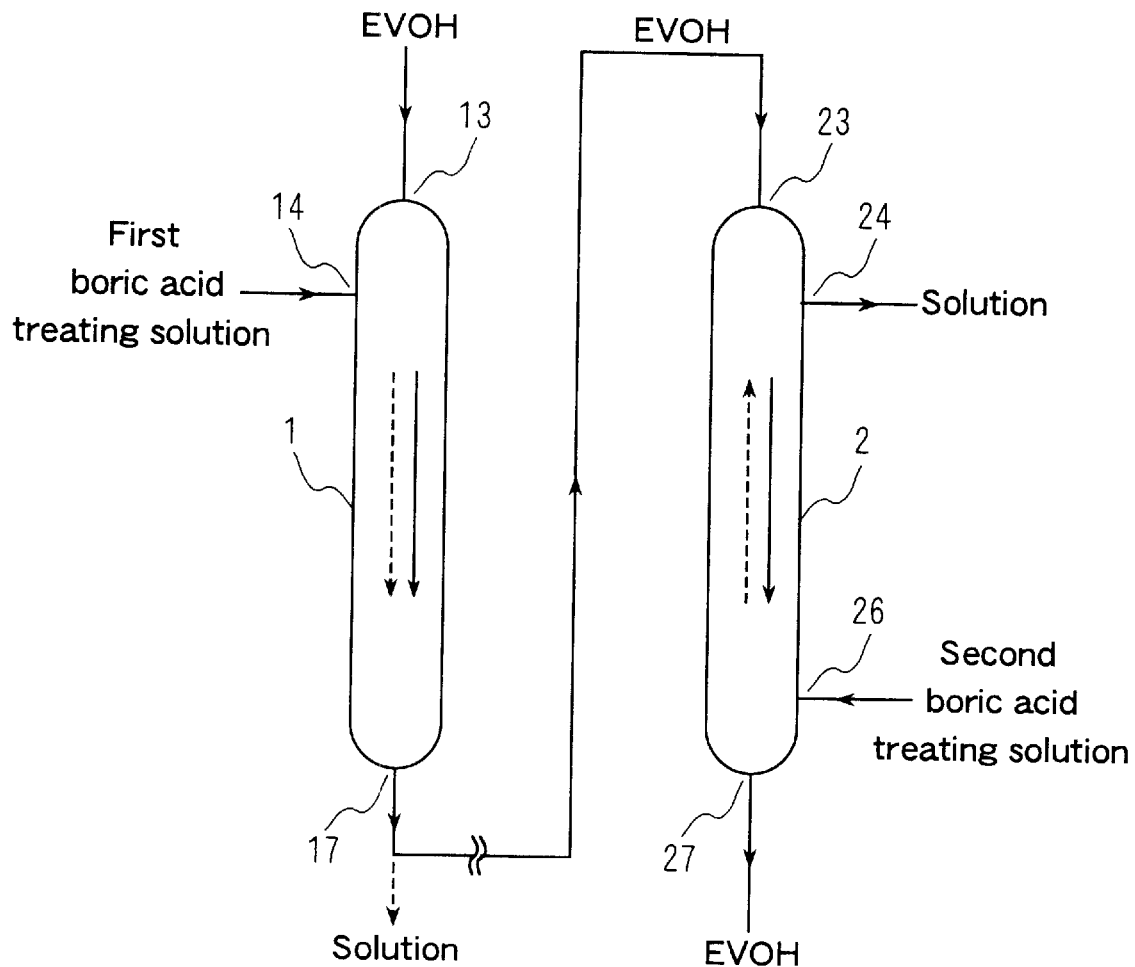
FIG. 6 shows still another example of treatment apparatus suitable for carrying out the method of the present invention.

In an embodiment shown in FIG. 4, a first treatment column 1 as a pre-treatment column and a second treatment column 2 as a final treatment column are used. Into the first treatment column 1, EVOH pellets are fed continuously through a top portion 13 thereof, and a first boric acid treatment solution (first solution) is fed continuously through a lower portion 16 thereof. The EVOH pellets and the first solution are brought into contact with each other in the first treatment column while flowing in countercurrent to each other. The EVOH pellets are continuously removed from the treatment column through a bottom portion 17 thereof, and the first solution is continuously removed from the treatment column through an upper portion 14 thereof As the boric acid treatment solution flows from the lower portion to the upper portion in the first treatment column, the concentration of boric acid in the boric acid treatment solution decreases. As the EVOH pellets flow from the upper portion to the lower portion in the first treatment column, the concentration of boric acid in the EVOH pellets increases. In this embodiment, it is also not necessary that the EVOH pellets and the boric acid treatment solution reach equilibrium with respect to boric acid in the vicinity of the opening for removal of the pellets at the bottom of the treatment column.

Subsequently, the EVOH pellets are introduced continuously into the second treatment column 2 through a top portion 23 thereof. In this treatment column, a second boric acid treatment solution (second solution) is also fed continuously through a lower portion 26 thereof, and the EVOH pellets and the second solution are brought into contact with each other in the second treatment column while flowing in countercurrent to each other. The EVOH pellets are continuously taken out of the second treatment column 2 through a bottom portion 27 thereof, and the second solution is continuously taken out of the treatment column through an upper portion 24 thereof. In the vicinity of the opening for removal of the pellets at the bottom of the treatment column, boric acid is contained in the EVOH pellets in a required concentration. Also, just as in the second embodiment, the second solution in contact with the EVOH pellets is prepared in advance as a solution having a boric acid concentration of at least 0.7 times but not more than 1.3 times, preferably substantially equal to, the solution equilibrium concentration.

In this embodiment, the distribution of boric acid concentration from the surface to the inside of the EVOH pellets also is made uniform while the EVOH pellets are in contact with the second solution. Therefore, EVOH resin composition pellets not having uneven distribution of boric acid on the surface while containing boric acid in a required concentration can be obtained. In this embodiment, an acid treatment solution used with the boric acid treatment solution also may be fed into at least one treatment column, including the final treatment column.

In this embodiment, because a plurality of treatment columns are used, the content of boric acid in the EVOH pellets is stabilized easily. Furthermore, because the treatment is carried out by countercurrent flow contact, the adsorbed amount of a treating agent used in combination, such as a carboxylic acid compound, can be stabilized.

Fifth Embodiment

Multi-column type: countercurrent flow/parallel flow treatment; parallel flow/countercurrent flow treatment When using multiple treatment columns, the treatment in each treatment column can be selected from a parallel flow treatment and a countercurrent flow treatment. In an embodiment shown in FIG. 5, a countercurrent flow treatment is carried out in a first treatment column 1, and a parallel flow treatment is carried out in a second treatment column 2. Conversely, in an embodiment shown in FIG. 6, a parallel flow treatment is carried out in a first treatment column 1, and a countercurrent flow treatment is carried out in a second treatment column 2. The details of the treatments in respective treatment columns are just as described in the third and fourth embodiments. The numeral signs in FIG. 5 and FIG. 6 also correspond to the numeral signs used in FIG. 3 and FIG. 4.

Usually, the EVOH resin compositions obtained by the above-described embodiments are further subjected to drying. The water content in the resin composition pellets composed of EVOH after drying is generally not more than 1 wt %, preferably not more than 0.5 wt %. The method for drying is not particularly limited, however, ventilation drying, fluidized drying and the like are suitable. A multistep drying process combining several drying methods also may be employed. Among these, a drying method in which fluidized drying is carried out first and then ventilation drying is carried out is preferred. To the dried EVOH, plasticizers, stabilizers, surfactants, crosslinking agents, metal salts, fillers, reinforcing materials such as various types of fibers, etc. may be added as needed.

After removing insoluble materials, the EVOH is molded into various forms such as films, sheets, containers, pipes, fibers and the like by melt molding. Melt molding may be effected by extrusion molding, inflation, blow molding, melt spinning, injection molding and the like. It is preferable that the temperature for melting is from 150° to 270° C. A blend of at least two types of EVOH that are different in polymerization degree, ethylene content, saponification degree and the like may be melt molded. Furthermore, plasticizers, stabilizers, surfactants, crosslinking agents, metal salts, fillers, reinforcing materials such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

Furthermore, the type of EVOH to be treated also is not particularly critical. Suitable EVOH can be produced by a known method in which ethylene and vinyl acetate are copolymerized and a resultant copolymer is saponified. The form of the EVOH to be treated also is not particularly critical, however, water-containing EVOH pellets obtained by extruding a methanol or water/methanol solution of EVOH, obtained through saponification, in water (which may contain methanol) such that it coagulates in the form of strands, cutting the strands and washing them with water, are suitable.

EXAMPLES

The present invention will be illustrated further in detail with reference to the following non-limiting examples. Unless otherwise stated, "%" and "parts" are based on weight. Furthermore, pure water was used in all cases.

Methods of measuring properties in the examples are as follows:

(1) Measurement of water content 20 g of water-containing EVOH pellets as a sample were put in a well-dried weighing bottle, and dried at 120° C. for 24 hours with a hot air drying oven. From the change in the weight of the EVOH pellets before and after drying, the water content of the EVOH was determined using the following equation:

$$\text{Water content (\%)} = \{(\text{weight before drying} - \text{weight after drying})/\text{weight before drying}\} \times 100$$

(2) Determination of the concentration of a boron compound

When the sample was an aqueous solution, the content of a boron compound in the sample was determined in terms of the weight of boron element by ICP emission spectral analysis, using the aqueous solution. When the sample was dry EVOH resin composition pellets, the concentration of a boron compound in the sample was determined in terms of boron element by ICP emission spectral analysis, using a hydrochloric acid solution of the sample that was ashed in a platinum crucible at 600° C. after adding a sodium carbonate aqueous solution.

(3) Test of single-layer film formation

A single layer film was formed by the following method, and the appearance of a formed product was evaluated.

| | |
|---|---|
| Type: | Single screw extruder (non-vent type) |
| L/D: | 20 |
| Bore diameter: | 20 mm φ |
| Screw: | Single-start full-flight type, nitrided surface steel |
| Rotation of screw: | 40 rpm |
| Die: | Coat hanger die of 300 mm in width |
| Gap between lips: | 0.3 mm |
| Temperature setting for cylinders and die (C1/C2/C3/die): | 195/230/230/220 (° C.) |

(3-a) Evaluation of appearance (gels and hard spots)

The gels and hard spots (those of about 150 μm or more that can be observed with the naked eye) in a film were counted after one hour from the start of formation of a single-layer film. The counted number was converted into a number per 1.0 m². According to the number of the gels and hard spots, evaluation was made as follows:

A: less than 10 B: 10 or more but less than 20

C: 20 or more but less than 40 D: 40 or more but less than 60

E: 60 or more (3-b) Evaluation of appearance (long-run property)

Figure 7:
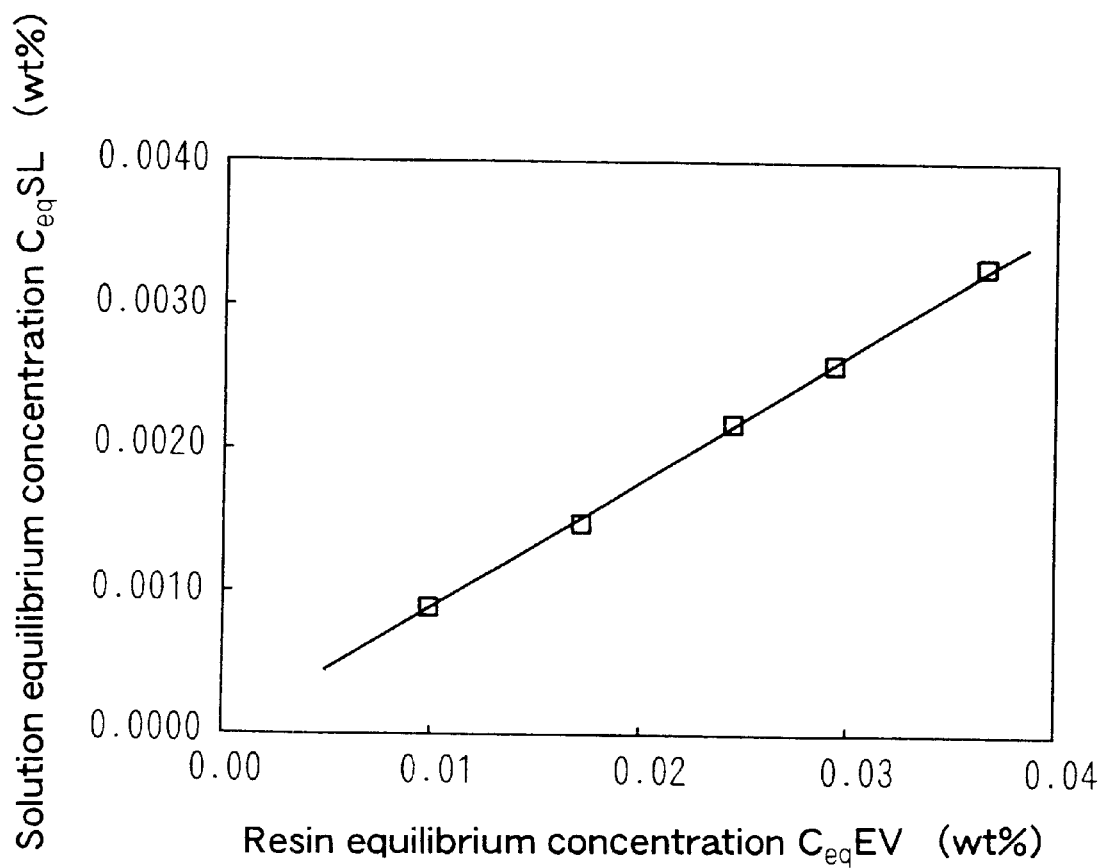
FIG. 7 shows an example of a relationship between a resin equilibrium concentration (CeqEV) and a solution equilibrium concentration (CeqSL) with respect to a concentration of a boron compound.

The above-described film formation was carried out continuously for 8 days. The film was sampled every one hour, and gels and hard spots (those of about 150 μm or more that can be observed with the naked eye) were counted. The counted number was converted into a number per 1.0 m². According to the tendency of the number of gels and hard spots to increase, evaluation was made as follows:

A: no tendency of increase B: slight tendency of increase
C: strong tendency of increase (4) Calculation of Equilibrium Concentration Several types of aqueous solutions of a boron compound having varied concentrations of the boron compound were prepared. To 170 parts of each aqueous solution, 100 parts of water-containing EVOH pellets were added. The mixture was stirred at 30° C. for 7 days with such a strength to flow the pellets. The obtained water-containing EVOH resin composition pellets were dried at 80° C. for 3 hours and subsequently at 107° C. for 24 hours with a hot air dryer to produce dry EVOH resin composition pellets. The concentration of the boron compound in the dry pellets (resin equilibrium concentration: CeqEV), and the concentration of the boron compound in the aqueous solution after the stirring (solution equilibrium concentration: CeqSL) were determined as values converted in terms of boron element. Using the obtained values, a graph was plotted with the resin equilibrium concentration (CeqEV) on the horizontal axis and the solution equilibrium concentration (CeqSL) on the vertical axis. This graph is of an EVOH having an ethylene content of 38 mol % and a saponification degree of 99.5 mol %. As shown in FIG. 7, the obtained graph was an approximately straight line. When a concentration of the boron compound in the EVOH is specified, a corresponding solution equilibrium concentration can be determined from this graph.

Example 1 :Parallel flow contact one-column system

A water/methanol (at a ratio of 35/65 by weight) solution of an EVOH having an ethylene content of 38 mol % and a saponification degree of 99.5 mol % (EVOH resin concentration of 40 wt %) was extruded in a coagulation bath filled with a solution composed of water/methanol (at a ratio of 87/13 by weight) in the form of strands and allowed to coagulate, and thereafter the strands were cut by a cutter to obtain EVOH pellets. These EVOH pellets were washed further with water, and thereby EVOH pellets having a water content of 55% were obtained.

These water-containing EVOH pellets were fed into a treatment column (200 cm in height, 40 cm in diameter) through a top portion thereof at a rate of 27 L/hour, while an aqueous solution (30° C.) containing 0.106% boric acid (0.019% in terms of boron element), 0.023% phosphoric acid and 0.098% sodium acetate was fed into the treatment column through an upper portion thereof (at 180 cm in height) at a rate of 12 L/hour. The water-containing EVOH resin composition pellets and accompanying aqueous solution were taken out of the treatment column continuously through a lower portion thereof such that the face of the EVOH pellets and the face of the aqueous solution in the treatment column were at approximately constant levels (the face of the EVOH pellets: at 160 cm in height, the face of the aqueous solution: at 190 cm in height).

The aqueous solution and the water-containing EVOH resin composition pellets were sampled after (a) 0 hour, (b) 12 hours and (c) 24 hours from the initiation of removal. The water-containing EVOH resin composition pellets were dried at 80° C. for 3 hours and subsequently at 107° C. for 24 hours with a hot air dryer so as to obtain dry EVOH resin composition pellets.

The boron compound concentrations in the sampled aqueous solutions and the sampled dry EVOH resin composition pellets were analyzed. As a result, the boron concentrations in the aqueous solutions were (CSL/a) 0.00244%, (CSL/b) 0.00224% and (CSL/c) 0.00229%, respectively. Also, the boron concentrations in the dry EVOH resin composition pellets were (CEV/a) 0.027%, (CEV/b) 0.025% and (CEV/c) 0.026%, respectively. The solution equilibrium concentrations determined from FIG. 7, defining each boron concentration in the dry EVOH resin composition pellets as a resin equilibrium concentration (CeqEV), are (CeqSL/a) 0.00239%, (CeqSL/b) 0.00222% and (CeqSL/c) 0.00231%. These boron concentrations are summarized in Table 1.

A single-layer film was formed using the dry EVOH resin composition pellets obtained, and appearance was evaluated. As a result, all of (a) to (c) were evaluated as A or B with respect to the number of gels and hard spots generated, and it was possible to obtain a film in which few gels and hard spots were generated. However, generation of gels and hard spots was confirmed right after the initiation of the test. Also, no tendency of increase in gels and hard spots was confirmed in continuous film formation for 8 days, and good long-run property was exhibited. The results are shown in Table 2.

Example 2 :Parallel Flow/Countercurrent Flow Contact Two-Column System

EVOH pellets having an ethylene content of 38 mol %, a saponification degree of 99.5 mol % and a water content of 55% obtained by coagulating and cutting in the same way as in Example 1 were fed into a first treatment column (200 cm in height, 40 cm in diameter) through a top portion thereof at a rate of 27 L/hour, while an aqueous solution (30° C.) containing 0.106% boric acid (0.019% in terms of boron element) was fed into the treatment column through an upper portion thereof (at 180 cm in height) at a rate of 12 L/hour. The water-containing EVOH resin composition pellets and the aqueous solution were taken out of the treatment column continuously through a lower portion thereof such that the face of the EVOH pellets and the face of the aqueous solution in the treatment column were at approximately constant levels (the face of the EVOH pellets: at 160 cm in height, the face of the aqueous solution: at 190 cm in height).

Subsequently, the water-containing EVOH pellets taken out of the first treatment column were fed into a second treatment column (200 cm in height, 40 cm in diameter) through a top portion thereof at a rate of 27 L/hour, while an aqueous solution (30° C.) containing 0.013% boric acid (0.0023% in terms of boron element; this corresponds to the solution equilibrium concentration CeqSL when the boron content in the EVOH resin composition is 0.026%), 0.013% phosphoric acid and 0.055% sodium acetate was fed into the second treatment column through a lower portion thereof (at 10 cm in height) at a rate of 40 L/hour. The aqueous solution was taken out of the second treatment column through an upper portion thereof (at 190 cm in height), and the water-containing EVOH resin composition pellets were taken out of the second treatment column continuously through a lower portion thereof such that the face of the EVOH pellets in the treatment column (at 160 cm in height) was at an approximately constant level.

The water-containing EVOH resin composition pellets and accompanying aqueous solution were sampled after (a) 0 hour, (b) 12 hours and (c) 24 hours from the initiation of taking out. The water-containing EVOH resin composition pellets were dried at 80° C. for 3 hours and subsequently at 107° C. for 24 hours with a hot air dryer so as to obtain dry EVOH resin composition pellets.

The boron compound concentrations in the sampled aqueous solutions and the sampled dry EVOH resin composition pellets were analyzed. As a result, the boron concentrations in the aqueous solutions were (CSL/a) 0.00232%, (CSL/b) 0.00229% and (CSL/c) 0.00229%, respectively, which were approximately the same as the concentration of the aqueous solution fed through the lower portion. Furthermore, the boron concentrations in the dry EVOH resin composition pellets were (CEV/a) 0.026%, (CEV/b) 0.026% and (CEV/c) 0.026%, respectively. The solution equilibrium concentrations determined from FIG. 7, defining each boron concentration in the dry EVOH resin composition pellets as a resin equilibrium concentration (CeqEV), are (CeqSL/a) 0.00231%, (CeqSL/b) 0.00231% and (CeqSL/c) 0.00231%. These boron concentrations are summarized in Table 1.

A single-layer film was formed using the dry EVOH resin composition pellets obtained, and appearance was evaluated. As a result, all of (a) to (c) were evaluated as A with respect to the number of gels and hard spots generated, and it was possible to obtain pellets of good quality in which few gels and hard spots were generated from right after the initiation of the test. Also, no tendency of increase in gels and hard spots was confirmed in continuous film formation for 8 days, and good long-run property was exhibited. The results are shown in Table 2.

Example 3: Countercurrent Low/Countercurrent Flow Contact Two-Column System

EVOH pellets having an ethylene content of 38 mol %, a saponification degree of 99.5 mol % and a water content of 55% obtained by coagulating and cutting in the same way as in Example 1 were fed into a first treatment column (200 cm in height, 40 cm in diameter) through a top portion thereof at a rate of 27 L/hour, while an aqueous solution (30° C.) containing 0.036% boric acid (0.0063% in terms of boron element) was fed into the treatment column through a lower portion thereof (at 10 cm in height) at a rate of 40 L/hour. The EVOH pellets were taken out of the treatment column continuously through a lower portion thereof such that the face of the EVOH pellets in the treatment column was at an approximately constant level (the face of the EVOH pellets: at 160 cm in height).

Subsequently, the EVOH resin composition pellets taken out of the first treatment column were fed into a second treatment column (200 cm in height, 40 cm in diameter) through a top portion thereof at a rate of 27 L/hour, while an aqueous solution (30° C.) containing 0.013% boric acid (0.0023% in terms of boron element; this corresponds to the solution equilibrium concentration CeqSL when the boron content in the EVOH resin composition is 0.026%), 0.013% phosphoric acid and 0.055% sodium acetate was fed into the second treatment column through a lower portion thereof (at 10 cm in height) at a rate of 40 L/hour. The aqueous solution was taken out of the second treatment column through an upper portion thereof (at 190 cm in height), and the water-containing EVOH resin composition pellets were taken out of the second treatment column continuously through a lower portion thereof such that the face of the EVOH pellets in the treatment column was at an approximately constant level (at 160 cm in height).

The water-containing EVOH resin composition pellets and accompanying aqueous solution were sampled after (a) 0 hour, (b) 12 hours and (c) 24 hours from the initiation of their removal. The water-containing EVOH resin composition pellets were dried at 80° C. for 3 hours and subsequently at 107° C. for 24 hours with a hot air dryer so as to obtain dry EVOH resin composition pellets.

The boron compound concentrations in the sampled aqueous solutions and the sampled dry EVOH resin composition pellets were analyzed. As a result, the boron concentrations in the aqueous solutions were (CSL/a) 0.00233%, (CSL/b) 0.00228% and (CSL/c) 0.00230%, respectively, which were approximately the same as the concentration of the aqueous solution fed through the lower portion. Furthermore, the boron concentrations in the dry EVOH resin composition pellets were (CEV/a) 0.028%, (CEV/b) 0.026% and (CEV/c) 0.026%, respectively. The solution equilibrium concentrations determined from FIG. 7, defining each boron concentration in the dry EVOH resin composition pellets as a resin equilibrium concentration (CeqEV), are (CeqSL/a) 0.00249%, (CeqSL/b) 0.00231% and (CeqSL/c) 0.00231%. These boron concentrations are summarized in Table 1.

A single-layer film was formed using the dry EVOH resin composition pellets obtained, and appearance was evaluated. As a result, all of (a) to (c) were evaluated as A or B with respect to the number of gels and hard spots generated, and it was possible to obtain a film in which few gels and hard spots were generated. However, generation of a few gels and hard spots was confirmed right after the initiation of the test. Also, no tendency of increase in gels and hard spots was confirmed in continuous film formation for 8 days, and good long-run property was exhibited. The results are shown in Table 2.

Comparative Example: Countercurrent Low Contact One-Column System

EVOH pellets having an ethylene content of 38 mol %, a saponification degree of 99.5 mol % and a water content of 55% obtained by coagulating and cutting in the same way as in Example 1 were fed into a treatment column (200 cm in height, 40 cm in diameter) through a top portion thereof at a rate of 27 L/hour, while an aqueous solution (30° C.) containing 0.036% boric acid (0.0063% in terms of boron element), 0.013% phosphoric acid and 0.055% sodium acetate was fed into the treatment column through a lower portion thereof (at 10 cm in height) at a rate of 40 L/hour. The aqueous solution was taken out of the treatment column through an upper portion thereof (at 190 cm in height), and the water-containing EVOH resin composition pellets were taken out of the treatment column continuously through a lower portion thereof such that the face of the EVOH pellets in the treatment column was at an approximately constant level (at 160 cm in height).

The water-containing EVOH resin composition pellets and accompanying aqueous solution were sampled after (a) 0 hour, (b) 12 hours and (c) 24 hours from the initiation of removal. The water-containing EVOH resin composition pellets were dried at 80° C. for 3 hours and subsequently at 107° C. for 24 hours with a hot air dryer so as to obtain dry EVOH resin composition pellets.

The boron compound concentrations in the sampled aqueous solutions and the sampled dry EVOH resin composition pellets were analyzed. As a result, the boron concentrations in the aqueous solutions were (CSL/a) 0.00617%, (CSL/b) 0.00607% and (CSL/c) 0.00598%, respectively, which were approximately the same as the concentration of the aqueous solution fed through the lower portion. Furthermore, the boron concentrations in the dry EVOH resin composition pellets were (CEV/a) 0.047%, (CEV/b) 0.029% and (CEV/c) 0.024%, respectively. The solution equilibrium concentrations determined from FIG. 7, defining each boron concentration in the dry EVOH resin composition pellets as a resin equilibrium concentration (CeqEV), are (CeqSL/a) 0.00417%, (CeqSL/b) 0.00257% and (CeqSL/c) 0.00204%. These boron concentrations are summarized in Table 1.

A single-layer film was formed using the dry EVOH resin composition pellets obtained, and appearance was evaluated. As a result, all of (a) to (c) were evaluated as D or E with respect to the number of gels and hard spots generated, and generation of gels and hard spots was significant. Furthermore, a strong tendency of increase in gels and hard spots was confirmed in continuous film formation for 8 days, and there was also a problem in the aspect of long-run property. The results are shown in Table 2.

TABLE 1

| | Boron Concentration | | | |
|---|---|---|---|---|
| | Concentration in aqueous solution CSL | Solution equilibrium concentration CeqSL | CSL/CeqSL | Resin equilibrium concentration CeqEV |
| Ex. 1 | | | | |
| a | 0.00244 | 0.00239 | 1.02 | 0.027 |
| b | 0.00224 | 0.00222 | 1.01 | 0.025 |
| c | 0.00229 | 0.00231 | 0.99 | 0.026 |
| Ex. 2 | | | | |
| a | 0.00232 | 0.00231 | 1.00 | 0.026 |
| b | 0.00229 | 0.00231 | 0.99 | 0.026 |
| c | 0.00229 | 0.00231 | 0.99 | 0.026 |
| Ex. 3 | | | | |
| a | 0.00233 | 0.00249 | 0.94 | 0.028 |
| b | 0.00228 | 0.00231 | 0.99 | 0.026 |
| c | 0.00230 | 0.00231 | 1.00 | 0.026 |
| Comp. Ex. | | | | |
| a | 0.00617 | 0.00417 | 1.48 | 0.047 |
| b | 0.00607 | 0.00257 | 2.36 | 0.029 |
| c | 0.00598 | 0.00204 | 2.93 | 0.024 |

TABLE 2

| | Gels and hard spots | Long-run property |
|---|---|---|
| Example 1 | | |
| a | B | A |
| b | A | |
| c | A | |
| Example 2 | | |
| a | A | A |
| b | A | |
| c | A | |
| Example 3 | | |
| a | B | A |
| b | A | |
| c | A | |
| Comp. Ex. | | |
| a | E | C |
| b | D | |
| c | D | |

As described above, good results were obtained when CSL/CeqSL was not more than 1.3. More specifically, very favorable results were obtained when CSL/CeqSL was in the range of about 0.9 to 1.1, particularly from 0.99 to 1.01.

In the samples (b) and (c) of Comparative Example, although the boron compound concentrations in the dry pellets are little different from the boron compound concentrations in the dry pellets obtained in Examples 1 to 3 as whole pellets, generation of gels and hard spots was significant. This appears to be due to uneven distribution of the concentration of the boron compound in the pellets obtained in Comparative Example. Thus, in EVOH resin composition pellets containing a boron compound, a non-uniform concentration of the boron compound in the pellets has a significant effect.

As described above in detail, according to the present invention, by reducing uneven distribution of boron compound in an EVOH resin composition, generation of fish eyes at the time of melt molding of EVOH can be inhibited, and long-run property at melt molding can be improved. Moreover, the present invention can be carried out using a treatment column with good productivity, and has a very large utility value in this technical field.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing an ethylene-vinyl alcohol copolymer resin composition, comprising
    (a) contacting particles of ethylene-vinyl alcohol copolymer with a solution containing a boron compound, and
    (b) subsequently removing a portion of said copolymer in contact with a portion of a solution in which the concentration of boron compound in said portion of solution is substantially equal to a solution equilibrium concentration,
    to obtain a substantially homogeneous distribution of said boron compound within said particles,
    wherein said solution equilibrium concentration is the concentration of the boron compound in a solution obtained when the copolymer is soaked in the solution and the boron compound in the copolymer equilibrates with the boron compound in the solution.

2. A method as claimed in claim 1, wherein said method is a continuous treatment method.

3. A method as claimed in claim 1, wherein the copolymer and the solution are continuously fed into a treatment apparatus, and the copolymer in contact with a solution containing the boron compound in a concentration of between 0.7 and 1.3 times a solution equilibrium concentration is continuously removed from said treatment apparatus.

4. The method according to claim 1, wherein the solution equilibrium concentration is at least 0.0001 wt% but not more than 0.05 wt % based on the weight of the element boron.

5. The method according to claim 1, wherein the ethylene-vinyl alcohol copolymer is brought into contact with the solution in a treatment column in which the copolymer and the solution flow in parallel with each other.

6. The method according to claim 5, wherein the concentration of the boron compound in the solution to be fed into the treatment column is at least 0.001 wt % but not more than 0.35 wt % based on the weight of the element boron.

7. The method according to claim 3, which method comprises:
    continuously feeding the ethylene-vinyl alcohol copolymer into a treatment column through an upper portion thereof;
    continuously feeding a first solution containing a boron compound into the treatment column through a middle portion thereof;

continuously feeding a second solution containing a boron compound in a concentration of between 0.7 and 1.3 times the solution equilibrium concentration into the treatment column through a lower portion thereof;

bringing the copolymer into contact with the first and second solutions in the treatment column while the copolymer flows in countercurrent to the first and second solutions;

continuously discharging the first and second solutions through an upper portion of the treatment column; and removing the copolymer in contact with the second solution continuously through a bottom portion of the treatment column.

8. The method according to claim 7, wherein the concentration of the boron compound in the first solution is higher than the concentration of boron compound in the second solution.

9. The method according to claim 7, wherein the concentration of boron compound in the first solution prior to contact with the ethylene vinyl-alcohol copolymer is at least 0.001 wt % but not more than 0.35 wt % based on the weight of the element boron.

10. The method according to claim 3, wherein the copolymer is brought into contact with a first solution containing a boron compound prior to treating the copolymer with a second solution containing a boron compound, wherein said second solution is the solution with which the copolymer is in contact when removed from the treatment apparatus.

11. The method according to claim 10, wherein the concentration of the boron compound in the first solution is higher than the concentration of boron compound in the second solution.

12. The method according to claim 10, wherein the concentration of boron compound in the first solution prior to contact with the ethylene vinyl-alcohol copolymer is at least 0.001 wt % but not more than 0.35 wt % based on the weight of the element boron.

13. The method according to claim 3, wherein the ethylene-vinyl alcohol copolymer is contacted with the first solution in a pre-treatment apparatus.

14. The method according to claim 13, wherein the ethylene-vinyl alcohol copolymer, following contact with the first solution, is subsequently contacted with the second solution in a treatment column in which the copolymer and the second solution flow in parallel with each other.

15. The method according to claim 13, wherein the ethylene-vinyl alcohol copolymer, following contact with the first solution, is subsequently contacted with the second solution containing a boron compound in a concentration of between 0.7 and 1.3 times the solution equilibrium concentration in a treatment column in which the copolymer and the second solution flow in countercurrent to each other.

16. The method according to claim 1, wherein the ethylene-vinyl alcohol copolymer is additionally contacted with at least one compound selected from a carboxylic acid compound, a phosphoric acid compound, an alkali metal salt, and an alkaline earth metal salt.

17. The method according to claim 1, wherein the boron compound is a boric acid, a boric acid salt or a mixture thereof.

18. The method according to claim 1, wherein the ethylene-vinyl alcohol copolymer has an ethylene content of at least 20 mol % but not more than 70 mol %, and a saponification degree of at least 90 mol %.

* * * * *